United States Patent
Maroney

(10) Patent No.: US 9,792,048 B2
(45) Date of Patent: Oct. 17, 2017

(54) IDENTIFYING DISK DRIVES AND PROCESSING DATA ACCESS REQUESTS

(71) Applicant: Western Digital Technologies, Inc., Irvine, CA (US)

(72) Inventor: John E. Maroney, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 158 days.

(21) Appl. No.: 14/746,598

(22) Filed: Jun. 22, 2015

(65) Prior Publication Data

US 2016/0370997 A1    Dec. 22, 2016

(51) Int. Cl.
G06F 3/06    (2006.01)

(52) U.S. Cl.
CPC ............ G06F 3/061 (2013.01); G06F 3/0659 (2013.01); G06F 3/0661 (2013.01); G06F 3/0683 (2013.01); G06F 3/0685 (2013.01); G06F 3/0688 (2013.01); G06F 3/0689 (2013.01); *G06F 2003/0692* (2013.01)

(58) Field of Classification Search
CPC ...... G06F 3/061; G06F 3/0659; G06F 3/0688; G06F 3/0679; G06F 19/322; G06F 3/0685; G06F 3/0689; G06F 3/0655; G06F 3/0661; G06F 3/0683
USPC .... 711/4, 111, 112, 113, 114, 115, 161, 162; 710/306, 5; 1/1
See application file for complete search history.

(56) References Cited

U.S. PATENT DOCUMENTS

| | | |
|---|---|---|
| 7,657,692 B2 | 2/2010 | Lee et al. |
| 7,701,705 B1 | 4/2010 | Szeremeta |
| 8,064,194 B2 | 11/2011 | Szeremeta |
| 8,113,873 B1 | 2/2012 | Sarraf |
| 8,133,426 B1 | 3/2012 | Yurchenco et al. |
| 8,225,019 B2 | 7/2012 | Asnaashari |
| 8,291,125 B2* | 10/2012 | Intrater ................ G06F 3/061 710/4 |
| 8,358,395 B1 | 1/2013 | Szeremeta |
| 8,417,979 B2 | 4/2013 | Maroney |
| 8,462,460 B1 | 6/2013 | Szeremeta et al. |
| 8,498,088 B1 | 7/2013 | Klein |
| 8,547,658 B1 | 10/2013 | Szeremeta |
| 9,026,687 B1* | 5/2015 | Govande ............. G06F 13/10 710/10 |
| 2007/0005869 A1* | 1/2007 | Balraj ................. G06F 9/4401 711/2 |

(Continued)

FOREIGN PATENT DOCUMENTS

WO    2014209764 A1    12/2014

OTHER PUBLICATIONS

International Search Report and Written Opinion for PCT/US2016/038184 mailed Sep. 6, 2016.

*Primary Examiner* — Tuan Thai
*Assistant Examiner* — Edward Waddy, Jr
(74) *Attorney, Agent, or Firm* — Chang & Hale LLP

(57) ABSTRACT

Systems and methods are disclosed for identifying disk drives and processing data access requests. A disk drive may be identified as an Advanced Host Controller Interface (AHCI) drive, a Non-Volatile Memory Express (NVME) drive, and/or an ATA packet interface (ATAPI) drive. Data access requests for the disk drive may be translated to NVME commands, AHCI commands, or ATAPI commands, based on whether the drive is identified as a NVME drive, an AHCI drive, and/or an ATAPI drive.

20 Claims, 5 Drawing Sheets

(56) References Cited

U.S. PATENT DOCUMENTS

| | | | |
|---|---|---|---|
| 2008/0005398 A1 | 1/2008 | Huffman | |
| 2013/0007332 A1* | 1/2013 | Teh | G06F 13/385 |
| | | | 710/313 |
| 2013/0086311 A1 | 4/2013 | Huang et al. | |
| 2013/0318289 A1* | 11/2013 | Tomlin | G06F 3/061 |
| | | | 711/103 |
| 2014/0229659 A1 | 8/2014 | Jones | |
| 2015/0067418 A1* | 3/2015 | Lee | G06F 11/263 |
| | | | 714/720 |
| 2015/0160886 A1* | 6/2015 | Hoglund | G06F 3/0656 |
| | | | 710/18 |

* cited by examiner

IDENTIFYING DISK DRIVES AND PROCESSING DATA ACCESS REQUESTS

BACKGROUND

Distribution of data storage across one or more data storage devices can provide increased data security through data redundancy. One type of data storage device may be a direct-attached storage (DAS) device. DAS devices may provide one or more computing devices with direct access to data via a connection cable (e.g., via a direct or physical connection). Another type of data storage device may be a network-attached storage (NAS) device. NAS devices may provide access to data over computer networks (e.g., via a wired and/or wireless network).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to identifying disk drives and processing data access requests.

Overview

Data storage devices/systems may provide one or more computing devices with file-level data storage. One example of a data storage device/system may be a DAS device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.) coupled to a DAS interface (e.g., a communication interface such as USB 2.X, USB 3.X, Thunderbolt, etc.) of the DAS device. A DAS device may provide a convenient mechanism for transferring data between computing devices, increasing the storage capacity (e.g., increase the storage space) of a computing device, and/or providing increased data security through data redundancy.

Another example of a data storage device/system may be a NAS device. A NAS device may be coupled to a network via a NAS interface (e.g., a network interface such as Ethernet, 802.11 (Wi-Fi), etc.). A NAS device may provide file-level data storage over a network (e.g., a computer network), wherein access to the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability for a data storage device to identify a disk drive as an Advanced Host Controller Interface (AHCI) drive, a Non-Volatile Memory Express (NVME) drive, and/or an ATA packet interface (ATAPI) drive. Data access requests for the disk drive may be translated to NVME commands, AHCI commands, or ATAPI commands, based on whether the drive is identified as a NVME drive, an AHCI drive, and/or an ATAPI drive.

Data Storage Devices

Figure 1:
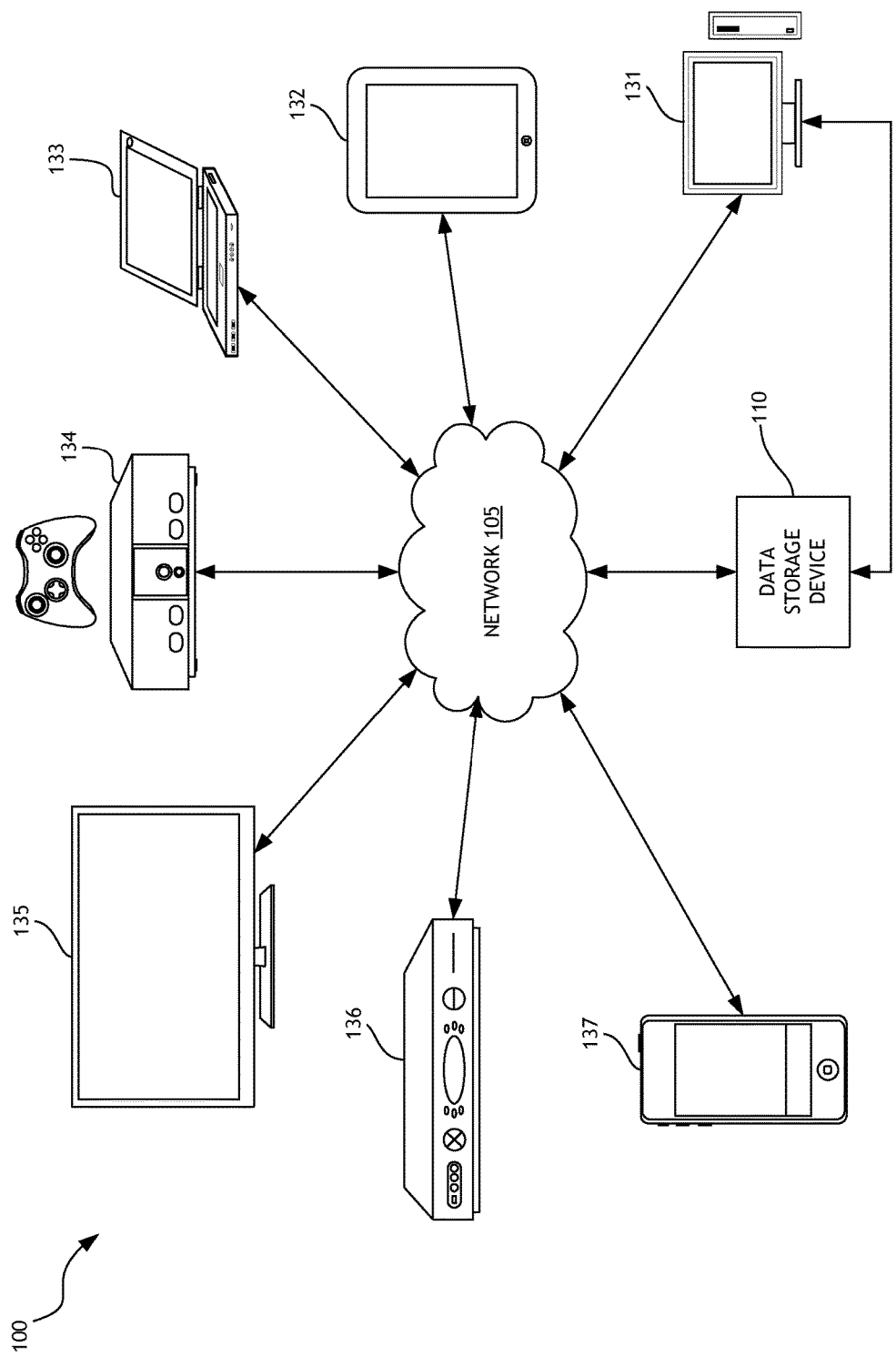
FIG. 1 is a diagram of a data storage system, according to an embodiment.

FIG. 1 is a diagram of a data storage system 100, according to an embodiment. In the data storage system 100 a data storage device 110 may be communicatively coupled to one or more client devices (e.g., computing devices) in order to provide file-based data storage services to the one or more client devices (e.g., one or more computing devices). Types of client devices (e.g., computing devices) that may have access to the data storage device 110 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other types of computing devices.

The data storage device 110 device may provide various client devices (e.g., phones 137, cable set-top boxes 136, smart TV's 135, video game consoles 134, laptop computers 133, tablet computers 132, desktop computers 131) with access to various types of user data stored on the data storage device 110. The data storage device 110 may also allow users to store various types of user data on the data storage device 110. The data storage device 110 may comprise magnetic media, hard disk media, and/or solid-state media. While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

With further reference to FIG. 1, the data storage device 110 (e.g., magnetic disk drive, hybrid hard drive, solid-state drive, etc.) may include a controller (not shown in FIG. 1) configured to receive data commands and to execute such commands in one or more non-volatile memory components of the data storage device 110. Such commands may include data read/write commands, and the like. The controller may be configured to receive data commands from a communication interface residing on a computing device. Data commands may specify a block address in the data storage device 110 and data may be accessed/transferred based on such commands. The data commands may also be referred to as data access requests.

The data storage device 110 may be configured to store data in one or more magnetic recording disks and/or the solid state memory devices/arrays. In an embodiment, the data storage device 110 may comprise a cable box, a backup disk drive, a media storage unit, a streaming media device, a digital camera, or any other electronic device which may store data that may need to be accessed directly or wirelessly.

In certain embodiments, the data storage device 110 may store data received from a client device such that the data storage device 110 acts as data storage for the client device. To facilitate this function, the data storage device 110 may implement a logical interface. The logical interface can present to the client device memory as a set of logical addresses (e.g., sequential/contiguous addresses) where data may be stored. Internally, the controller may map logical addresses to various physical memory addresses in the non-volatile memory of the data storage device 110. Mapping data indicating the mapping of logical addresses to physical memory addresses may be maintained in the data storage device 110.

In one embodiment, the data storage device 110 may be a DAS device. The DAS device may be directly coupled to client device (e.g., a desktop computer 131) via connection cable 120. The connection cable 120 may be coupled to a communication interface (e.g., a USB 2.X interface, a USB 3.X interface, a Thunderbolt interface, etc.) of the DAS device (e.g., data storage device 110). In another embodiment, the data storage device 110 may also be a NAS device. The NAS device may also be coupled to the client devices (e.g., computing devices) 131-137 via a network 105. The NAS device may be coupled to the network 105 via a network interface (e.g., an Ethernet interface, an 802.11 (Wi-Fi) interface, etc.). Each of the client devices 131-137 may also be coupled to the network 105 via a network interface. In one embodiment, network 105 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

In one embodiment, the data storage device 110 may receive data access requests from the client devices 131-137 via the communication interface (e.g., a DAS interface such as USB 2.X, USB 3.X, Thunderbolt) and/or via the network interface (e.g., Ethernet, 802.11, etc.). The data access requests may be messages, commands, and/or requests to access data on the data storage device. For example, a data access request may indicate that a computing device wants to read data from the data storage device 110. In another example, a data access request may indicate that a computing device wants to write data to the data storage device 110.

Although data storage devices/drives/systems may provide various benefits, as described above, in certain configurations, such systems may be associated with various issues and/or drawbacks. As discussed above, the data storage device 110 may be a DAS device that is coupled to one or more of the client devices 131-137 via a connection cable 120. A disk drive (or other storage media) may be identified as an ATAPI drive (e.g., a drive that supports ATAPI commands). Some disk drives may support AHCI commands and/or NVME commands. However, a data storage device may still identify the disk drive as an ATAPI drive even though the disk drive may support AHCI commands and/or NVME commands. Identifying the disk drive as an ATAPI drive may decrease the performance and/or efficiency of the disk drive because NVME and/or AHCI may include functions, features, and/or operations that allow a disk drive to operate more quickly and/or efficiently.

It may be useful to provide a data storage device that determines whether disk drives support NVME, AHCI, and/or ATAPI. The data storage device may identify the disk drives as NVME drives, AHCI drives, or ATAPI drives and may translate data access requests based on whether the disk drives support NVME, AHCI, and/or ATAPI.

Identifying Disk Drives

Figure 2:
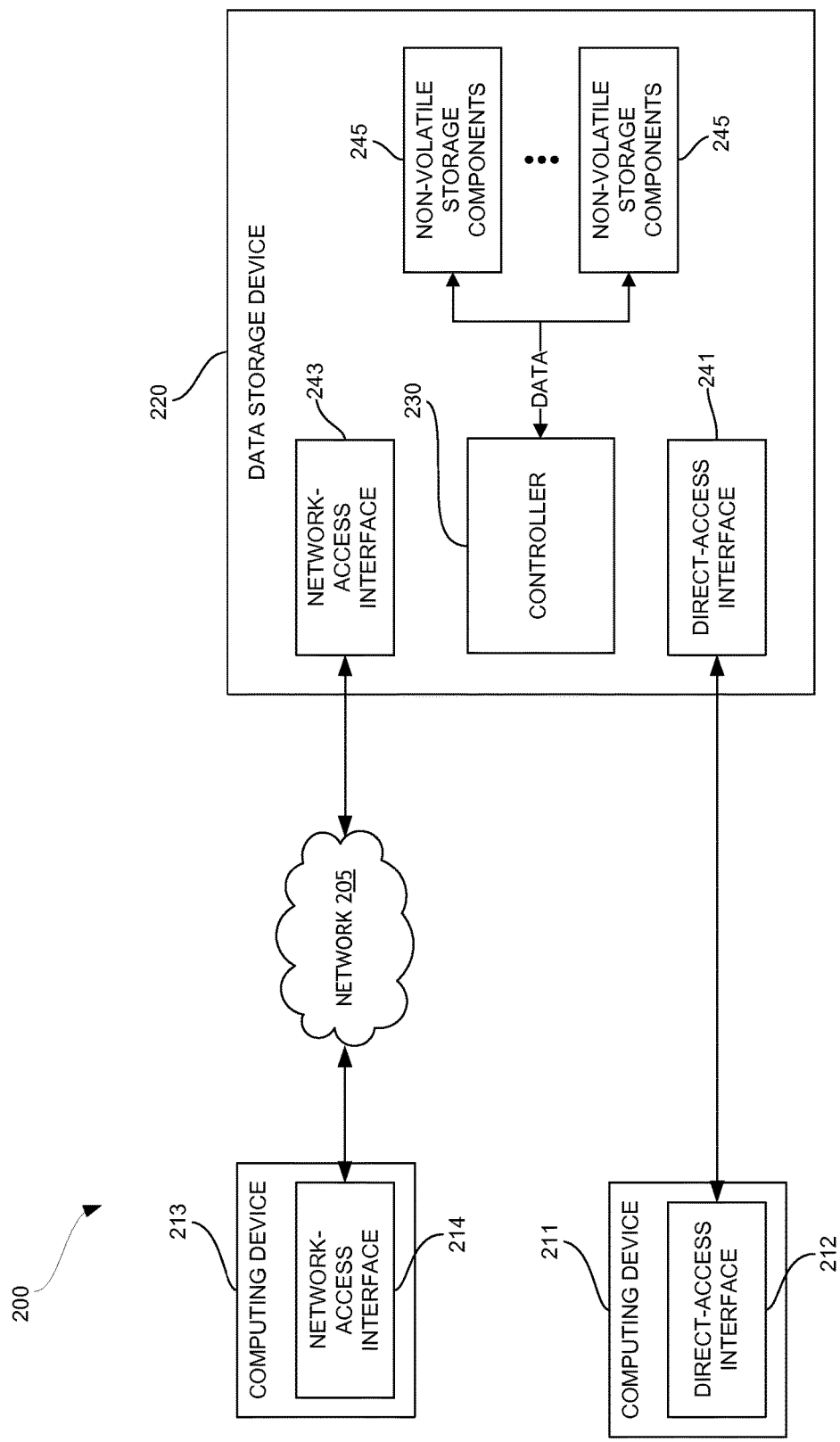
FIG. 2 is a diagram of a data storage system, according to an embodiment.

FIG. 2 is a diagram of a data storage system 200 according to an embodiment. The data storage system 200 includes a computing device 211, a computing device 213, a connection cable 250, and a data storage device 220. Each of the computing devices 211 and 213 may be a laptop computer, a desktop computer, a server computer, a tablet computer, a smart phone, a set-top box, a smart TV, a video game console, etc. The data storage device 220 may include a controller 230, a DAS interface 241 (e.g., USB 2.X, USB 3.X, Thunderbolt, eSATA, etc.), a NAS interface 243 (e.g., Ethernet, Wi-Fi, etc.), and non-volatile storage components 245. In one embodiment, the non-volatile storage components 245 may include non-volatile magnetic media, and/or solid-state memory, such as NAND flash. The controller 230 may provide overall control for the data storage device 220. In certain embodiments, the data storage device 220 may be a hard disk drive. The non-volatile storage components 245 may include one or more disks and the data storage device 220 may further include one or more heads (not shown) actuated radially over the disk(s), and a spindle motor for rotating the disk(s). Alternatively to, or in addition to, magnetic rotating media, solid-state memory and/or other non-volatile memory such as MRAM and/or phase change memory may be used. In certain embodiments, the data storage device 220 may be, for example, a hybrid hard drive including both magnetic media and solid-state media (e.g., the non-volatile storage components 245 may include both magnetic disks and solid state media/memory). In one embodiment, the non-volatile storage components 245 may be coupled to the controller via one or more serial bus connectors. Examples of serial bus connectors include, but are not limited to, serial ATA (SATA) connectors, peripheral component interconnect express (PCIe) connectors, and SATA Express connectors.

The controller 230 may receive data access requests (e.g., data and storage access commands) from a DAS interface 212 (e.g., a USB interface, a Thunderbolt interface) of the computing device 211. Data access requests communicated by the DAS interface 212 may include write and read commands issued by the computing device 211. The data access requests may specify a LBA, or range of LBAs, in the data storage device 220, and the controller 230 may execute the received data access requests in the non-volatile storage components 245. The controller 230 may also receive data access request from a NAS interface 214 (e.g., an Ethernet interface, a Wi-Fi interface, etc.) of the computing device 213. The controller may determine an LBA and/or a range of LBAs in the data storage device 220 based on the data access requests and may execute the received data access requests in the non-volatile storage components 245. In a hybrid hard drive, data may be stored in a magnetic media storage component as well as non-volatile solid-state memory.

The data storage device 220 may store data received from the computing devices 211 and 213, such that the data storage device 220 acts as memory for the computing devices 211 and 213. To facilitate this memory function, the controller 230 may implement a logical interface. The logical interface may present to the computing devices 211 and 213 the memory of the data storage device 220 as a set of logical addresses (e.g., contiguous address) where data can be stored. The controller 230 may map logical addresses to various physical memory addresses in the non-volatile storage components 245 and/or other memory module(s).

The data storage device 220 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization; the array may be accessed by the computing devices 211 and 213 as a single drive. Data may be distributed across the RAID memory modules/drives according to any desirable or practical RAID level, depending on the level of redundancy and/or performance desired. For example, the data storage device 220 may be configured to implement RAID 0, RAID 1, RAID 5, RAID 6, RAID 10, other RAID technology, or other erasure coding technology, depending on data reliability, availability, performance and/or capacity considerations or requirements.

The computing device 211 may be coupled to the data storage device 220 via connection cable 250. The connection cable 250 may directly connect the computing device 211 and the data storage device 220. The connection cable 250 may use one or more communication interfaces (such as a bus interface) and/or protocols that may allow the computing device 211 to communicate with the data storage device 220. The DAS interface 212 and 214 may be USB interfaces, Thunderbolt interfaces, serial attached SCSI (SAS), eSATA interface, etc.

In one embodiment, the connection cable 250 may include one or more data lines (e.g., one or more wires, pins, etc.) that allow the computing device 211 to communicate data with the data storage device 220. For example, the connection cable 250 may include data lines (not shown in FIG. 2) that the computing device 211 may use to read data from and/or write data to the data storage device 220. The computing device 211 may communicate data to and from the data storage device using the DAS interface 212 (e.g., via the DAS interface 212). In another embodiment, the computing device 211 may provide an input voltage to the data storage device 220 and the data storage device 220 may use the input voltage to operate one or more components of the data storage device 220 (e.g., the controller 230, the non-volatile storage components 245, a motor, etc.). The connection cable 250 may include one or more voltage lines (e.g., wires, pins, etc.) that may receive the input voltage from the computing device 211 via the DAS interface 212. The one or more voltage lines may provide the input voltage (received from the computing device 211) to the data storage device 220 via the communication interface 240. In a further embodiment, the data storage device 220 may be coupled to a separate power source (e.g., may be coupled to a battery, to an AC adaptor, to a wall outlet, etc.).

In one embodiment, the connection cable 250 may include a bridge unit (not shown in FIG. 2). For example, the connection cable 250 may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

The computing device 213 may be communicatively coupled to the data storage device 220 via a network 205 (e.g., one or more of a Wi-Fi network, a LAN, a cellular network, etc.). The computing device 213 may send data (e.g., files, images, movies, etc.) and/or data access requests to the data storage device 220 via the NAS interface 214 (e.g., an Ethernet interface, a Wi-Fi interface, etc.) and the network 205. The data storage device 220 may receive the data and/or data access requests from the computing device 213 via the NAS interface 243.

In one embodiment, the controller 230 may determine whether each disk drive in the data storage device 220 supports Non-Volatile Memory Express (NVME) commands and/or Advanced Host Controller Interface (AHCI) commands. The controller 230 may identify each of the disk drives as NVME drives, AHCI drives, and/or ATAPI drives based on whether each disk drive supports NVME commands, AHCI commands, and/or ATAPI commands. In another embodiment, the controller 230 may receive one or more data access requests for a disk drive via the DAS interface 241. The controller 230 may translate the one or more data access requests to NVME commands, AHCI commands, and/or ATAPI commands based on whether the disk drive supports NVME commands, AHCI commands, and/or ATAPI commands. The controller 230 may schedule the data access requests based on the priorities for the data access requests (as discussed in more detail below).

Figure 3:
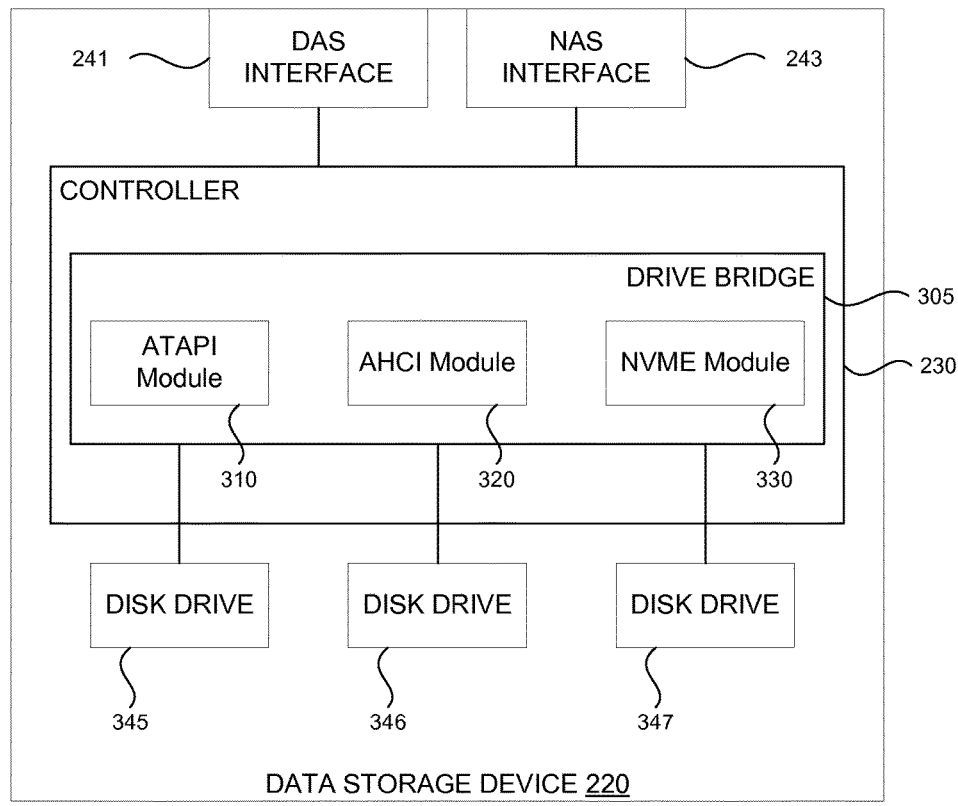
FIG. 3 is a diagram of a data storage device, according to an embodiment.

FIG. 3 is a diagram of a data storage device 220 according to an embodiment. The data storage device 220 includes a controller 230, a DAS interface 241 (e.g., USB 2.X, USB 3.X, Thunderbolt, eSATA, etc.), a NAS interface 243 (e.g., Ethernet, Wi-Fi, etc.), disk drive 345, disk drive 346, and disk drive 347. The data storage device 220 may store data received from computing devices such that the data storage device 220 acts as memory for the computing devices. The controller 230 includes a drive bridge 305. The drive bridge 305 includes an ATAPI module 310, an AHCI module 320, and a NVME module 330. In some embodiments, the drive bridge 305 may be separate from the controller 230. In one embodiment, the disk drives 345, 346, and 347 may be coupled to the controller 230 via serial bus connectors. For example, disk drive 345 may be coupled to the controller 230 via a SATA connector or a SATA Express connector. In another example, the disc drive 346 may be coupled to the controller 230 via a PCIe connector.

In one embodiment, the disk drive 345 may be a magnetic disk drive (e.g., a disk drive that includes magnetic media for storing data). The disk drive 345 may support ATAPI commands and/or AHCI commands. In another embodiment, the disk drive 346 may be a hybrid disk drive (e.g., a disk drive that includes both magnetic media and flash media/memory for storing data). The disk drive 346 may support ATAPI commands, AHCI commands, and/or NVME commands. In a further embodiment, the disk drive 346 may be a solid state disk/drive (e.g., a disk drive that includes flash media/memory for storing data). The disk drive 346 may support ATAPI commands, AHCI commands, and/or NVME commands.

As discussed above, the data storage device 220 may be coupled to one or more computing devices via the DAS interface 241 (e.g., a USB interface, an eSATA interface, a Thunderbolt interface, etc.). The data storage device may also be coupled to one or more computing devices via the NAS interface 243 (e.g., an Ethernet interface, a Wi-Fi interface, etc.). The data storage device 220 may receive the data and/or data access requests from the computing devices via DAS interface 241 and/or NAS interface 243. The data storage device 220 may be configured to implement data redundancy (e.g., RAID), wherein user data stored in data storage device 220 is maintained in two or more of the disk drives 345, 346, and 347.

In another embodiment, the data access requests received from the DAS interface 241 may include one or more LBAs and the controller 230 and/or drive bridge 305 may use the one or more LBAs to access (e.g., read and/or write) data stored in the disk drives 345, 346, and 347. For example, a data access request may include one or more LBAs. The controller 230 may map the one or more LBAs to various physical memory addresses in the disk drives 345, 346, and 347 and/or other memory module(s). In another embodiment, the data access requests received from the NAS interface may not include LBAs. For example, a data access request received from the NAS interface 243 may include an identifier (e.g., a file name, a hash, etc.) for a data object (e.g., a file, a directory) stored in the disk drives 345, 346, and 347. The controller 230 may determine and/or calculate one or more LBAs for data access requests received via the NAS interface 243 and the controller 230 and/or drive bridge 305 may use the one or more LBAs to access (e.g., read and/or write) data stored in the disk drives 345, 346, and 347.

In one embodiment, the controller 230 and/or drive bridge 305 may process/analyze each data access request to determine which of the disk drives 345, 346, and 347 a data access request is addressed to. The controller 230 and/or drive bridge 305 may determine which of the disk drives 345, 346, and 347 the data access request is addressed to by analyzing the one or more LBAs of the data access request. The controller 230 and/or drive bridge 305 may determine which of the disk drives 345, 346, and 347 is mapped to the one or more LBAs.

In one embodiment, the controller 230 may determine priorities for the data access requests received from the DAS interface 241 and the NAS interface 243. The controller 230 may determine (e.g., calculate) priorities for the data access requests based on one or more factors/parameters. In one embodiment, data access requests received from a type of interface may be given a higher priority (e.g., data access requests received from the DAS interface 241 may be given higher priority). In another embodiment, the size of a data access request may be used to determine a priority of a data access request. For example, a smaller data access request may be given more priority or a larger data access request may be given more priority. In a further embodiment, the locations in the disk drives 345, 346, and 347 for the data access requests may be used to determine priority's for data access requests. For example, data access requests that are accessing (e.g., reading and/or writing) data on a same track, cylinder, page, bank of memory, etc. may be given higher priority. In other embodiments, various other types of factors and/or parameters may be used to determine priorities for data access requests. In addition, combinations of factors and/or parameters may be used to determine priorities for data access requests. Furthermore, different factors and/or parameters may be weighted differently when determining priorities for data access requests.

In one embodiment, the controller 230 may schedule data access requests with higher priorities before data access requests with lower priorities. The controller 230 may insert data access requests into a queue (e.g., a data access request queue, a list, etc.) and the controller 230 may perform the data access requests that are in the queue. In one embodiment, the controller 230 may determine the priorities of data access requests prior to inserting the data access requests into the queue. For example, the controller 230 may calculate/determine priorities for a plurality of data access requests and may insert data access requests with higher priorities into the queue first. In another embodiment, the controller 230 may insert the data access requests into the queue and may determine the priorities of the data access requests. The controller 230 may reorder (e.g., shuffle) the data access requests within the queue after determining the priorities of the data access requests. In one embodiment, the controller 230 may also update the priorities of data access requests based on an amount of time that a data access request has been in the queue. For example, the longer a data access request remains in the queue, the higher the priority for the data access request. This may prevent a data access request from being pre-empted by other data access requests with higher priority.

In one embodiment, the controller 230 and/or drive bridge 305 may determine whether disk drive 347 in the data storage device 220 supports NVME commands. For example, the NVME module 330 may determine whether the disk drive 347 includes a NVME controller (e.g., a NVME disk controller). The NVME module 330 may transmit one or more messages, commands, and/or packets to the disk drive 347 to determine whether the disk drive 347 includes the NVME controller. The disk drive 347 may support NVME commands and the NVME module 330 may identify (e.g., present) the disk drive 347 as a NVME drive. For example, the NVME module 330 may identify the disk drive 347 as a NVME drive to a computing device (e.g., to an operating system of the computing device) that is coupled to the DAS interface 241 of the data storage device 220. The NVME module 330 may identify the disk drive 347 as a NVME drive by transmitting packets/messages to the computing device indicating that the disk drive 347 is a NVME drive. In another embodiment, the NVME module 330 may identify the disk drive 347 as a NVME drive when the computing device supports NVME drives (e.g., supports communication with NVME drives). For example, the NVME module 330 may determine whether an operating system (OS) of the computing device supports NVME drives. In another example, the NVME module 330 may determine whether the computing device has a driver (e.g., a software driver) that supports NVME drives. If the computing device does not support NVME drives, the drive bridge 305 may identify the disk drive 347 as an AHCI drive or an ATAPI drive.

In one embodiment, the controller 230 and/or drive bridge 305 may determine whether disk drive 346 in the data storage device 220 supports AHCI commands. For example, the AHCI module 320 may determine whether the disk drive 346 includes an AHCI controller (e.g., an AHCI disk controller) by transmitting transmit one or more messages, commands, and/or packets to the disk drive 346 to determine whether the disk drive 346 includes the AHCI controller. The disk drive 346 may support AHCI commands and the AHCI module 320 may identify the disk drive 346 as an AHCI drive. For example, the AHCI module 320 may identify the disk drive 346 as an AHCI drive to a computing device (e.g., to an operating system of the computing device) that is coupled to the DAS interface 241 of the data storage device 220. The AHCI module 320 may identify the disk drive 346 as an AHCI drive by transmitting packets/messages to the computing device indicating that the disk drive 346 is an AHCI drive. In another embodiment, the AHCI module 320 may identify the disk drive 346 as an AHCI drive when the computing device supports AHCI drives (e.g., supports communication with AHCI drives). For example, the AHCI module 320 may determine whether an operating system (OS) of the computing device supports AHCI drives. In another example, the AHCI module 320 may determine whether the computing device has a driver that supports AHCI drives. If the computing device does not support AHCI drives, the drive bridge 305 may identify the disk drive 347 as an ATAPI drive.

In a further embodiment, the controller 230 and/or drive bridge 305 may determine that the disk drive 345 does not support NVME commands and does not support AHCI commands. For example, the ATAPI module 310 may determine that the disk drive 345 does not includes a NVME controller and does not include an AHCI controller. The ATAPI module 310 may identify the disk drive 345 as an ATAPI drive to a computing device (e.g., to an operating system of the computing device) that is coupled to the DAS interface 241 of the data storage device 220 (e.g., by transmitting packets/messages to the computing device indicating that the disk drive 345 is an ATAPI drive).

As discussed above, the disk drive 347 may support NVME commands. The controller 230 and/or drive bridge 305 may receive one or more data access requests for the disk drive 347 via the DAS interface 241. For example, the data storage device 220 may receive USB attached SCSI (UAS) commands via the DAS interfaces 241. In another example, the data storage device 220 may receive USB bulk only transport (BOT) commands. In one embodiment, the NVME module 330 may translate the one or more data access requests to one or more NVME commands. For example, the NVME module 330 may use a translation table (e.g., table that may indicate one or more NVME commands that may be used to perform an USB BOT command or an UAS command). The NVME module 330 may also reorder and/or reformat parameters in the one or more data access requests when translating the one or more data access requests to one or more NVME commands.

Also as discussed above, the disk drive 346 may support AHCI commands. The controller 230 and/or drive bridge 305 may receive one or more data access requests (e.g., one or more UAS commands, one or more USB BOT commands, etc.) for the disk drive 346 via the DAS interface 241. In one embodiment, the AHCI module 320 may translate the one or more data access requests to one or more AHCI commands. For example, the AHCI module 320 may use a translation table (e.g., table that may indicate one or more AHCI commands that may be used to perform an USB BOT command or an UAS command). The AHCI module 320 may also reorder and/or reformat parameters in the one or more data access requests when translating the one or more data access requests to one or more AHCI commands.

Also as discussed above, the disk drive 345 may support ATAPI commands. The controller 230 and/or drive bridge 305 may receive one or more data access requests (e.g., one or more UAS commands, one or more USB BOT commands, etc.) for the disk drive 346 via the DAS interface 241. In one embodiment, the ATAPI module 310 may translate the one or more data access requests to one or more ATAPI commands. For example, the ATAPI module 310 may use a translation table (e.g., table that may indicate one or more ATAPI commands that may be used to perform an USB BOT command or an UAS command). The ATAPI module 310 may also reorder and/or reformat parameters in the one or more data access requests when translating the one or more data access requests to one or more ATAPI commands.

In one embodiment, the drive bridge 305 may perform functions, operations, and/or features that may be included in NVME drives and/or AHCI drives. For example, the NVME drives may support 65536 queues to store pending data access requests and each queue may store 65535 pending data access requests. The NVME module 330 may be configured to access the queues (e.g., to add data access requests to the queues, to remove data access requests from the queues, etc.). In another example, NVME drives may support multiple interrupts (e.g., may support 2048 Message Signaled Interrupts-X (MSI-X)) to allow the NVME drives to signal the computing device. The NVME module 330 may be configured to send, transmit, and/or signal the interrupts to the computing device. In a further example, AHCI drives may support one queue to store pending data access requests and the queue may store 32 pending data access requests. The AHCI module 320 may be configured to access the queue (e.g., to add data access requests to the queue, to remove data access requests from the queue, etc.). In yet another example, AHCI drives may support an interrupt (e.g., a single interrupt) to allow the AHCI drive to signal the computing device. The AHCI module 320 may be configured to send, transmit, and/or signal the interrupt to the computing device.

Although three disk drives are illustrated in FIG. 3, it shall be understood that in other embodiments, any number of disk drives and/or various types of disk drives may be included in the data storage device 220. For example, the data storage device 220 may include a hybrid drive and a solid state drive. In another example, the data storage device 220 may include two solid state drives and four magnetic disk drives. In one embodiment, the serial bus connectors and/or the serial buses that couple the disk drives to the controller 230 may be configured depending on the number of disk drives and/or the types of disk drives in the data storage device 220. For example, the number of PCIe links and the number of PCIe lanes in each link of a PCIe connector may be configured based on the number of disk drives and/or the types of disk drives in the data storage device 220. In another example, a NVME drive may use more PCIe lanes in a PCIe link. In a further example, a single PCIe connector may be used to connect to more magnetic disk drives (e.g., four magnetic disk drives) than solid state drives (e.g., one solid state drive).

Figure 4:
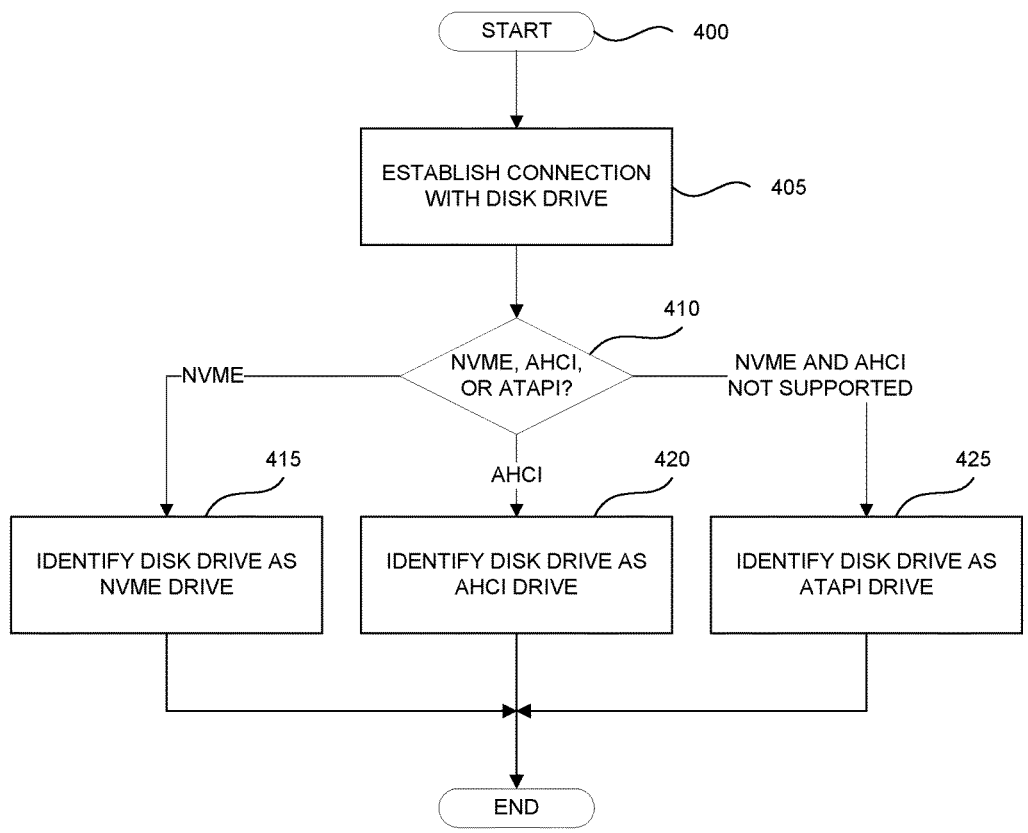
FIG. 4 is a flow diagram illustrating a process for identifying a disk drive, according to an embodiment.

FIG. 4 is a flow diagram illustrating a process 400 for identifying a disk drive, according to an embodiment. The process 400 may be performed by a controller and/or a drive bridge, as illustrated and discussed above in conjunction with FIGS. 1-3. The controller and the drive bridge may each be processing logic that includes hardware (e.g., circuitry, dedicated logic, programmable logic, microcode, etc.), software (e.g., instructions run on a processor to perform hardware simulation), firmware, or a combination thereof.

The process 400 begins at block 405 where the process 400 establishes a connection with a disk drive. For example, a disk drive may be coupled to a serial bus connector of a data storage device and a connection with the disk drive may be established via the serial bus connector. At block 410, the process 400 determines whether the disk drive supports NVME, AHCI, or ATAPI (e.g., whether the disk drive is a NVME drive, an AHCI drive, or an ATAPI drive). For example, the process 400 may determine whether the disk drive includes a NVME controller or an AHCI controller (as discussed above).

If the disk drive supports NVME, the process 400 may identify the drive as a NVME disk drive at block 415. For example, the process 400 may identify the disk drive as a NVME disk drive to an operating system of the computing device (as discussed above). In one embodiment, the process 400 may identify the disk drive as a NVME disk drive when the computing device supports NVME drives (as discussed above). If the disk drive supports AHCI, the process 400 may identify the drive as an AHCI disk drive at block 420. For example, the process 400 may identify the disk drive as a NVME disk drive to an operating system of the computing device (as discussed above). In one embodiment, the process 400 may identify the disk drive as an AHCI disk drive when the computing device supports AHCI drives (as discussed above). If the disk does not support AHCI or NVME, the process 400 may identify the drive as an ATAPI disk drive at block 425. For example, the process 400 may identify the disk drive as an ATAPI disk drive to an operating system of the computing device (as discussed above).

Figure 5:
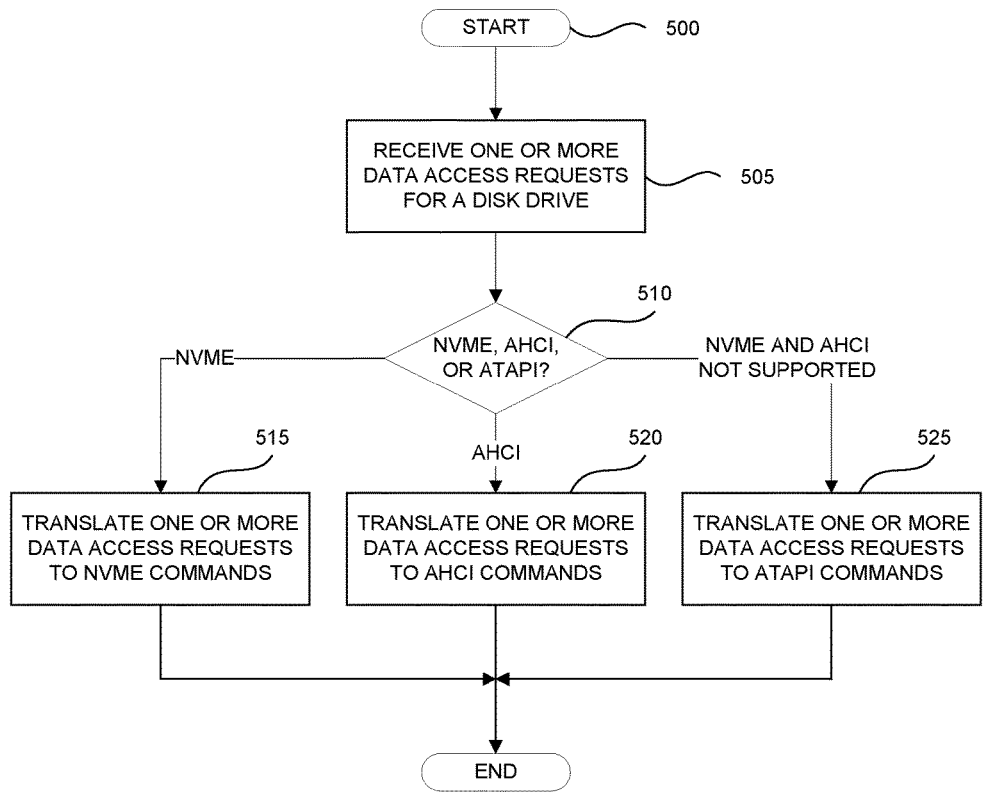
FIG. 5 is a flow diagram illustrating a process for processing data access requests, according to an embodiment.

FIG. 5 is a flow diagram illustrating a process 500 for processing data access requests, according to an embodiment. The process 500 may be performed by a controller and/or a drive bridge, as illustrated and discussed above in conjunction with FIGS. 1-3. The controller and the drive bridge may each be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process 500 receives one or more data access requests. For example, the process 500 may receive one or more data access requests via a DAS interface (e.g., a USB interface, an eSATA interfaces, etc.), as discussed above. At block 510, the process 500 determines whether the disk drive supports NVME, AHCI, or ATAPI (e.g., whether the disk drive is a NVME drive, an AHCI drive, or an ATAPI drive). For example, the process 500 may determine whether the disk drive includes a NVME controller or an AHCI controller (as discussed above). In another example, a data storage device may store data indicating whether the disk drive is a NVME drive, an AHCI drive, and/or an ATAPI drive when the disk drive is first identified. The process 500 may access the stored data to determine whether the disk drive supports NVME, AHCI, or ATAPI.

If the disk drive supports NVME, the process 500 may translate the one or more data access requests to one or more NVME commands at block 515. For example, the process 500 may use a translation table to translate the one or more data access requests to one or more NVME commands and to reorder/reformat parameters (as discussed above). If the disk drive supports AHCI, the process 500 may translate the one or more data access requests to one or more AHCI commands at block 520. For example, the process 500 may use the translation table to translate the one or more data access requests to one or more AHCI commands and to reorder/reformat parameters (as discussed above). If the disk drive does not support AHCI or NVME, the process 500 may translate the one or more data access requests to one or more ATAPI commands at block 525. For example, the process 500 may use the translation table to translate the one or more data access requests to one or more ATAPI commands and to reorder/reformat parameters (as discussed above).

Additional Embodiments

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device, comprising:
   a direct access interface configured to couple to a computing device;
   a set of serial bus connectors configured to couple to a set of disk drives; and
   a controller configured to couple to the set of disk drives via the set of serial bus connectors, the controller configured to:
     determine whether a first disk drive supports Non-Volatile Memory Express (NVME) commands or Advanced Host Controller Interface (AHCI) commands;
     identify the first disk drive as a NVME drive to the computing device in response to determining that the first disk drive supports NVME commands;
     identify the first disk drive as an AHCI drive to the computing device in response to determining that the first disk drive supports AHCI commands; and
     identify the first disk drive as an ATA packet interface (ATAPI) drive to the computing device in response to determining that the first disk drive does not support NVME commands and does not support AHCI commands.

2. The data storage device of claim 1, wherein the controller is configured to determine whether the first disk drive supports NVME commands or AHCI commands by:
   determining whether the first disk drive comprises a NVME controller or an AHCI controller.

3. The data storage device of claim 1, wherein the controller is further configured to:
   receive one or more data access requests from the computing device via the direct access interface.

4. The data storage device of claim 3, wherein the controller is further configured to:
   translate the one or more data access requests to one or more NVME commands in response to determining that the first disk drive supports NVME commands.

5. The data storage device of claim 3, wherein the controller is further configured to:
   translate the one or more data access requests to one or more AHCI commands in response to determining that the first disk drive supports AHCI commands.

6. The data storage device of claim 3, wherein the controller is further configured to:
   translate the one or more data access requests to one or more ATAPI commands in response to determining that the first disk drive supports ATAPI commands.

7. The data storage device of claim 1, wherein the set of disk drives comprises one or more of a magnetic disk drive, a solid state disk (SSD) drive, or a hybrid disk drive.

8. The data storage device of claim 1, wherein the set of serial bus connectors comprises serial ATA (SATA) connectors.

9. The data storage device of claim 1, wherein the set of serial bus connectors comprises peripheral component interconnect express (PCIe) connectors.

10. The data storage device of claim 1, wherein the controller is further configured to:
    determine whether a second disk drive supports NVME commands or AHCI commands;
    identify the second disk drive as a NVME drive to the computing device in response to determining that the second disk drive supports NVME commands;
    identify the second disk drive as an AHCI drive to the computing device in response to determining that the second disk drive supports AHCI commands; and
    identify the second disk drive as an ATAPI drive to the computing device in response to determining that the second disk drive does not support NVME commands and does not support AHCI commands.

11. The data storage device of claim 1, wherein the direct access interface comprises a universal serial bus (USB) interface.

12. The data storage device of claim 3, wherein the one or more data access requests comprise universal serial bus (USB) attached small computer system interface (SCSI) commands.

13. The data storage device of claim 3, wherein the one or more data access requests comprise universal serial bus (USB) bulk only transport (BOT) commands.

14. A method, comprising:
    determining whether a first disk drive of a set of disk drives supports Non-Volatile Memory Express (NVME) commands or Advanced Host Controller Interface (AHCI) commands;
    identifying the first disk drive as a NVME drive to a computing device in response to determining that the first disk drive supports NVME commands;
    identifying the first disk drive as an AHCI drive to the computing device in response to determining that the first disk drive supports AHCI commands; and
    identifying the first disk drive as an ATA packet interface (ATAPI) drive to the computing device in response to determining that the first disk drive does not support NVME commands and does not support AHCI commands.

15. The method of claim 14, wherein determining whether the first disk drive supports NVME commands or AHCI comprises:
    determining whether the first disk drive comprises a NVME controller or an AHCI controller.

16. The method of claim 14, further comprising:
    receiving one or more data access requests from the computing device via a direct access interface.

17. The method of claim 16, further comprising:
    translating the one or more data access requests to one or more NVME commands in response to determining that the first disk drive supports NVME commands.

18. The method of claim 16, further comprising:
translating the one or more data access requests to one or more AHCI commands in response to determining that the first disk drive supports AHCI commands.

19. The method of claim 16, further comprising:
translating the one or more data access requests to one or more ATAPI commands in response to determining that the first disk drive supports ATAPI commands.

20. The method of claim 14, further comprising:
determining whether a second disk drive supports NVME commands or AHCI commands;
identifying the second disk drive as a NVME drive to the computing device in response to determining that the second disk drive supports NVME commands;
identifying the second disk drive as an AHCI drive to the computing device in response to determining that the second disk drive supports AHCI commands; and
identifying the second disk drive as an ATAPI drive to the computing device in response to determining that the second disk drive does not support NVME commands and does not support AHCI commands.

* * * * *